C. A. HAGADONE.
CORN HARVESTER.
APPLICATION FILED MAR. 10, 1915.
1,303,298.
Patented May 13, 1919.
5 SHEETS—SHEET 2.
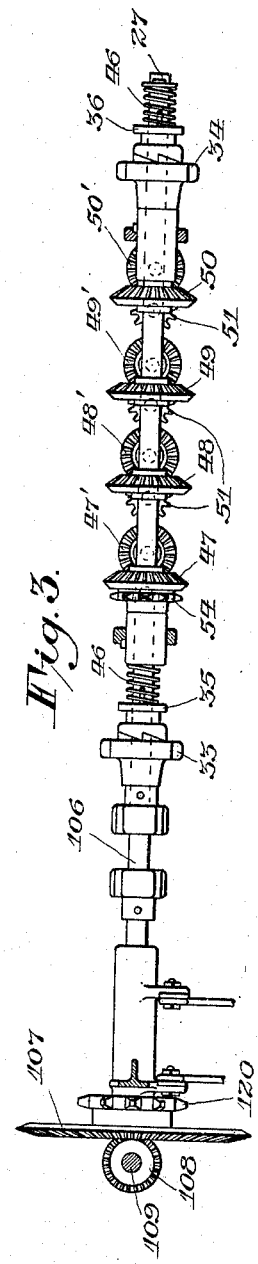
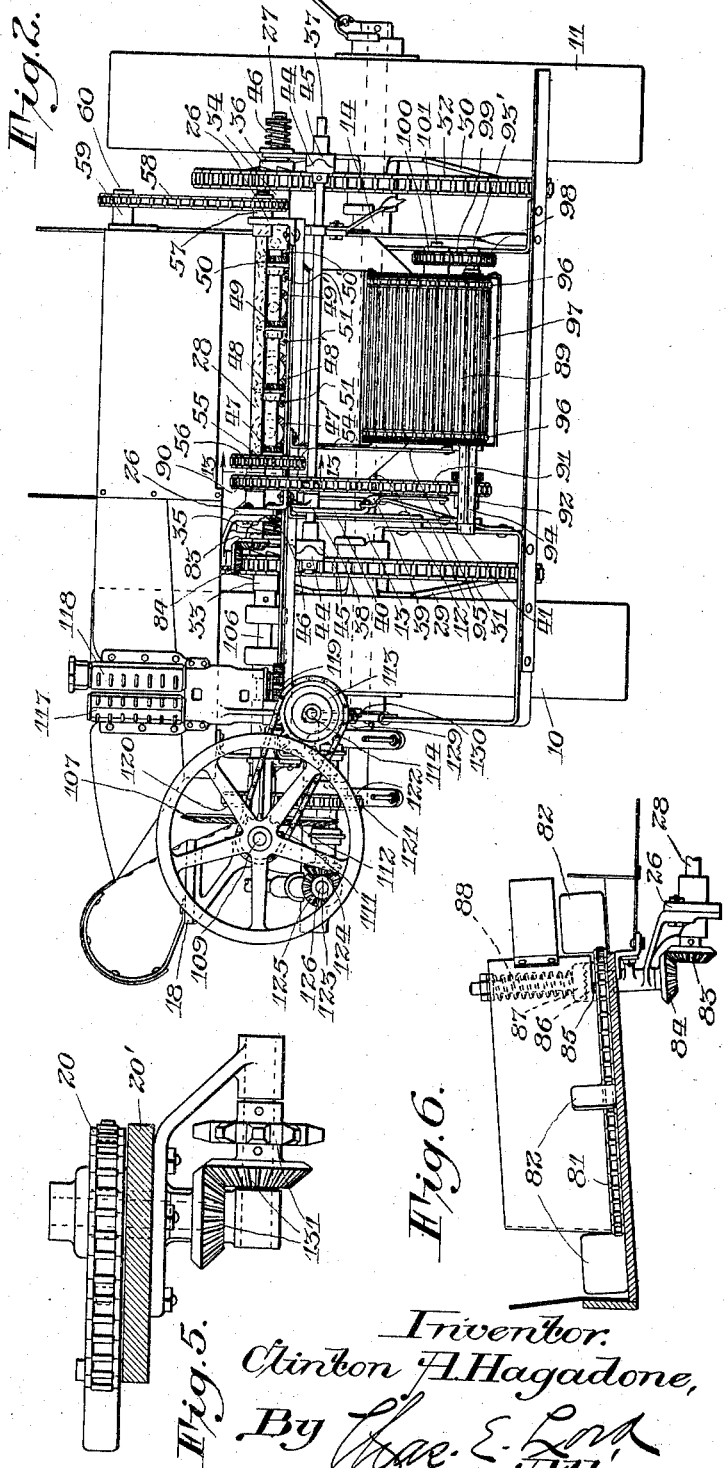
Inventor:
Clinton A. Hagadone,
By Chas. E. Lord
Atty.
Witnesses:
F. W. Hoffmeister
Chas. L. Byron

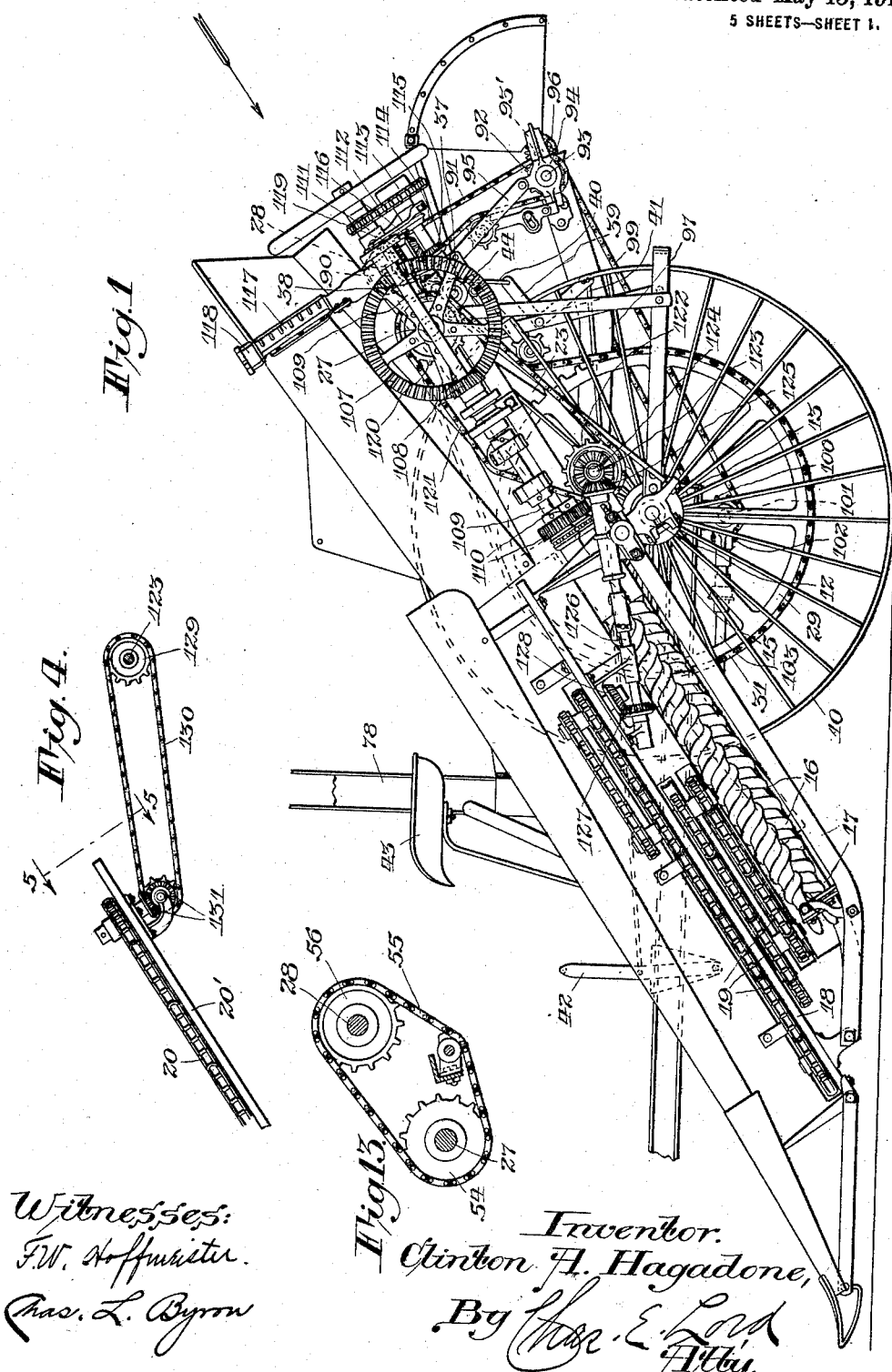

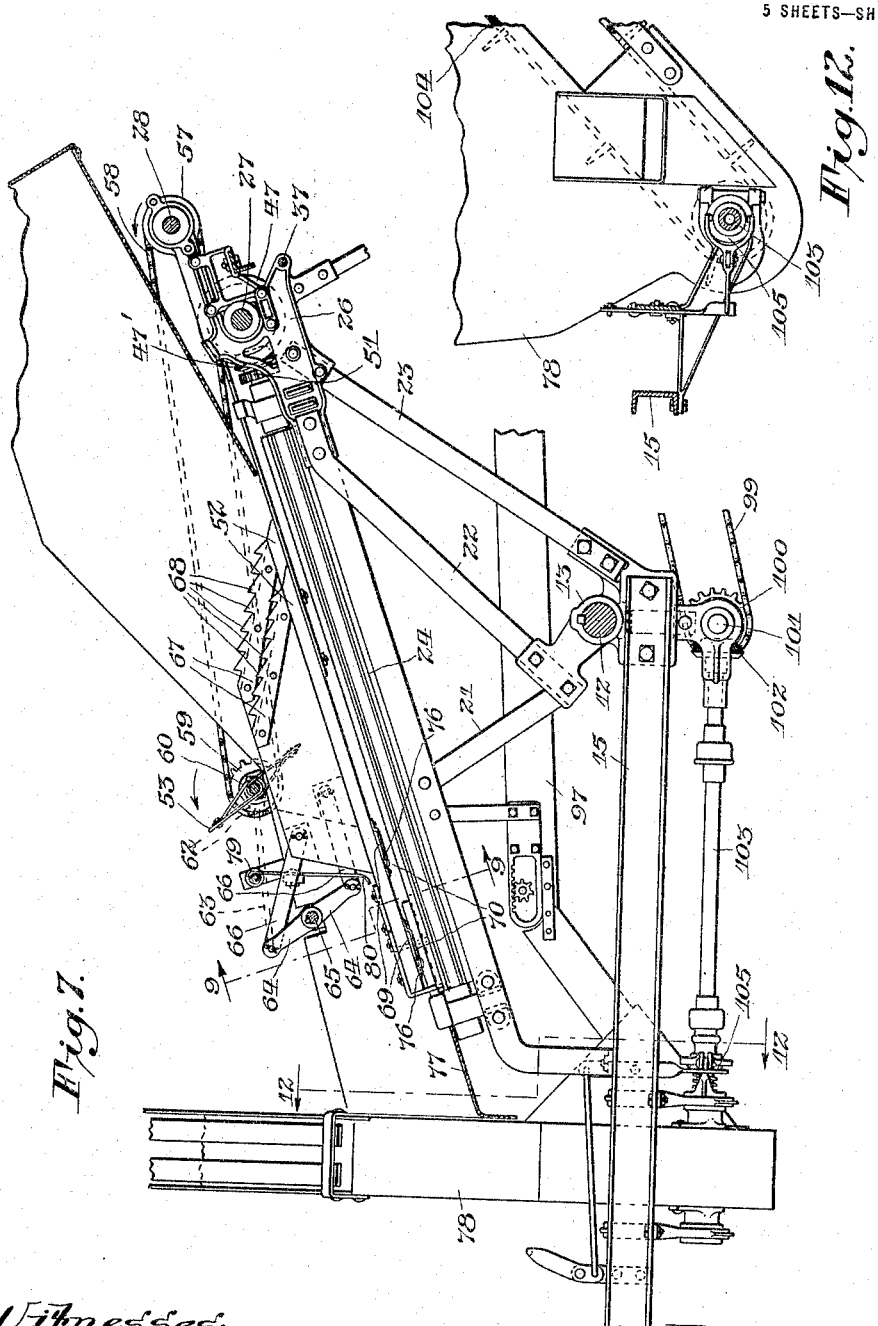

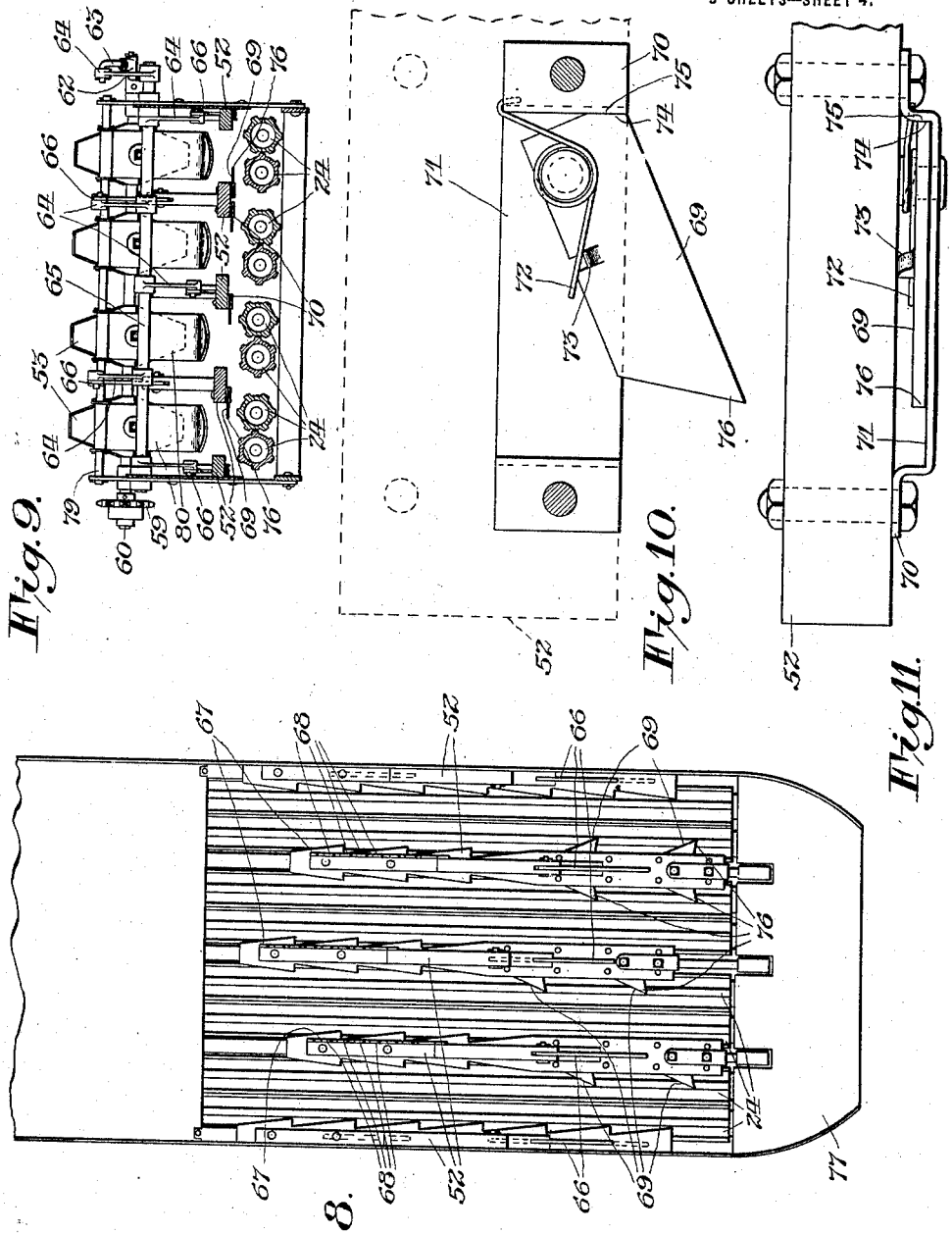

ated parts are matters of vital importance in the
UNITED STATES PATENT OFFICE.

CLINTON A. HAGADONE, OF WESTERN SPRINGS, ILLINOIS, ASSIGNOR, BY MESNE ASSIGNMENTS, TO INTERNATIONAL HARVESTER COMPANY, A CORPORATION OF NEW JERSEY.

CORN-HARVESTER.

1,303,298.     Specification of Letters Patent.    Patented May 13, 1919.

Application filed March 10, 1915. Serial No. 13,448.

*To all whom it may concern:*

Be it known that I, CLINTON A. HAGADONE, a citizen of the United States, residing at Western Springs, in the county of Cook and State of Illinois, have invented certain new and useful Improvements in Corn-Harvesters, of which the following is a full, clear, and exact specification.

This invention relates to corn harvesters of the class in which ears of corn are snapped from the stalks and husked.

In corn harvesters, such as pickers, there are many parts to be driven. To drive all of the necessary parts in an efficient manner, to use as few power transmitting connections as possible, using the minimum amount of power, to simplify and lighten the whole construction consistent with strength and durability, and to construct the various parts of a corn picker to best coöperate with other parts, are matters of vital importance in the design of corn pickers.

While some corn pickers are good in certain respects, they have fallen short in other respects to meet the requirements for successful commercial operation.

Accordingly, the objects of my invention are to simplify and lighten corn pickers, improve the driving mechanism in a manner to reduce the number of transmission parts, and to require the minimum amount of driving power, and to improve the construction and operation of various coöperating parts of the picker to obtain the most efficient results.

These and other objects are accomplished by means of the corn picker construction illustrated on the accompanying sheets of drawings, in which—

Figure 1 is a side elevation of a corn picker embodying my invention;

Fig. 2 is a rear elevation of the same picker taken in the direction of the arrow;

Fig. 3 is an enlarged view of the primary power transmitting shaft;

Fig. 4 is a detail view showing the driving arrangement of the stubbleward gathering chain;

Fig. 5 is a view taken substantially on the plane of line 5—5 of Fig. 4;

Fig. 6 is a fragmentary view showing the driving mechanism and arrangement of an endless corn conveyer chain which conveys corn from the snapping rolls to the husking rolls;

Fig. 7 is a fragmentary view, parts being in section, showing the husking rolls, agitators and beaters, among other parts, with driving connections;

Fig. 8 is a plan view showing the husking rolls and agitators, the latter having supplemental yieldably mounted ear forwarding devices;

Fig. 9 is a sectional view taken in the plane of line 9—9 of Fig. 7;

Fig. 10 is a detail view showing the yieldably mounted ear forwarding device which is secured to the agitators;

Fig. 11 is a side elevation of same;

Fig. 12 is a sectional view taken along the planes of irregular line 12—12 of Fig. 7, showing the elevator supporting and controlling means;

Fig. 13 is a detail view taken along the plane of line 13—13 of Fig. 2, showing the driving connection between the primary and secondary power transmitting shafts.

Figure 14:
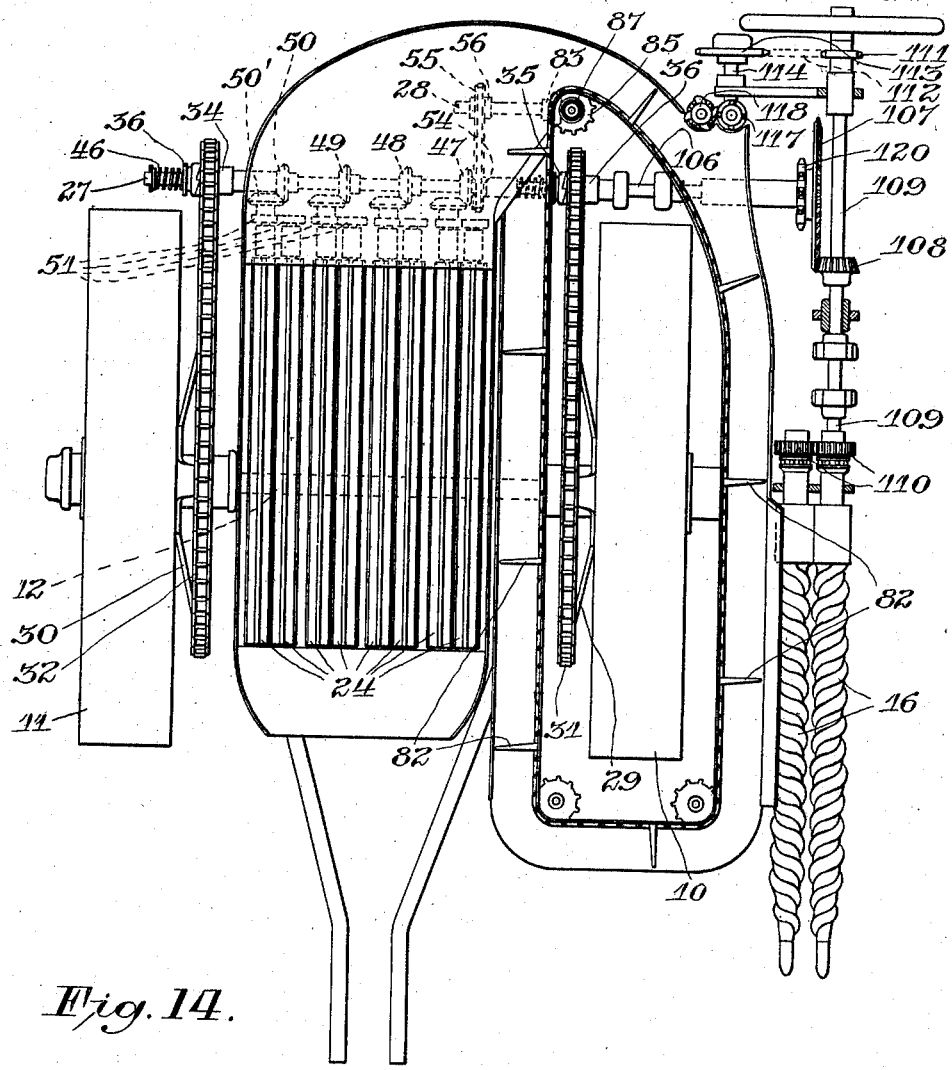
Fig. 14 is a plan view, showing certain parts of the machine, other parts being omitted for the sake of clearness.

The various novel features of my invention will be apparent from the following description and drawings, and will be particularly set forth in the appended claims.

I have illustrated my invention in connection with a corn picker having the usual grainward wheel 10 and stubbleward wheel 11, which are mounted upon an axle 12, keyed to which are sleeve members 13 and 14, to the former of which is secured the main frame supporting member 15 (Figs. 1, 7 and 12). This corn picker is provided with the usual coöperating snapping rolls 16, which are rotatably mounted and supported by supplemental frame members 17, which are connected to the grainward gathering board 18, which supports the usual grainward gathering chains 19, the stubbleward gathering chain 20 (Figs. 4 and 5) being supported on the stubbleward gathering board 20¹ in a similar manner. Also suitably supported by arms 21, 22 and 23 (Fig. 7), which are connected to the sleeve members 13 and 14, is the usual husking frame including in this case four sets of husking rolls 24, the arms 22 and 23 also supporting bracket members 26, in which are bearing members which support what I choose to term a primary power transmitting shaft 27, and a secondary power transmitting shaft 28, the latter being to the rear of and above the former.

The prior art discloses many arrangements for driving the various parts of a corn picker, most of which include extremely complicated and extremely numerous operating connections. It is one of the objects of my invention to simplify the driving connections to the various parts of a corn picker. In this connection I have shown what I consider to be the preferred arrangement, in which I have the primary power transmitting shaft 27 driven from two large sprocket wheels 29 and 30 rotatably mounted with the grainward and stubbleward wheels, respectively, said sprocket wheels being engaged by chains 31 and 32, respectively, which pass around sprocket wheels 33 and 34, respectively, both of which are rotatably secured to the primary power transmitting shaft 27. Slidably mounted upon and keyed to the primary power transmitting shaft 27 are two spring-pressed clutch members 35 and 36, which are operatively connected by a member 37, to which is secured an arm 38 connected to a bell crank lever 39 by a link 40 (Figs. 1 and 2), the bell crank being connected by a link 41 to a controlling lever 42 near the operator's seat 43. As shown in Figs. 2 and 3, the clutch members 35 and 36 are in engagement with the sprocket wheels 33 and 34 for transmitting power to the primary power transmitting shaft 27. These clutch members 35 and 36, however, may be withdrawn from engagement with the sprocket wheels 33 and 34 to prevent transmission of power from the wheels 10 and 11 by depressing the control lever 42, thereby causing a relative movement between the coöperating cam members 44 and 45, which causes the withdrawal of the clutch members 35 and 36 against the action of the springs 46, the springs 46 returning the clutch members into engagement with the sprockets 33 and 34 for again transmitting power to the primary power transmitting shaft when the control lever 42 is released.

It will be noted that the primary power transmitting shaft is provided with four fixedly secured bevel gears 47, 48, 49 and 50, each meshing with corresponding gears $47^1$, $48^1$, $49^1$, and $50^1$, mounted upon one of each of the pairs of husking rolls 24, said husking rolls being provided with the usual intermeshing gears 51, by means of which the other husking roll of each pair is rotated through the actuation of its corresponding husking roll. It is seen, therefore, that the husking rolls are driven directly from the primary power transmitting shaft 27.

For actuating the agitators 52 and beaters 53 over the husking rolls, the following driving connection is provided: Mounted integrally with the gear 47 on shaft 27 is a sprocket wheel 54 (Figs. 2 and 3 and 13), over which passes a chain 55, which also passes around a sprocket wheel 56 mounted upon the secondary power transmitting shaft 28. At the stubbleward end of the secondary power transmitting shaft 28 is another sprocket wheel 57, around which passes a chain 58, which also passes around a sprocket wheel 59 mounted on a rotary shaft 60 (Fig. 7), which is provided with a plurality of beaters 53 for the purpose of pushing back the ears of corn up the inclined husking rolls in order to prevent serious crowding or jamming of the ears at this part of the husking rolls. Suitably connected to the shaft 60 is a crank or eccentrically arranged member 62, to which is connected a link 63, which is connected in turn to one of a series of oppositely arranged arms 64 secured to a shaft 65, this shaft being given an oscillating reciprocatory movement through the action of the rotating crank or eccentric member 62. This reciprocatory motion is transmitted to the agitators 52 by links 66, which connect ends of the arms 64 to said agitators 52, adjacent agitators moving in opposite directions. It will be noted that the rear portions of the agitators 52 slope or are tapered downwardly and rearwardly, and on these tapered portions are secured plates 67 provided with teeth 68 which extend upwardly and forwardly instead of rearwardly, the object in having the teeth extending forwardly being to draw the ears of corn forwardly with respect to the husking rolls, and at the same time cause the ears of corn to be alined in a parallel relationship with the husking rolls. Should an ear of corn bridge the toothed plates on adjacent agitators, the ear would be thrust forwardly instead of rearwardly to obtain the desired results.

At this point I desire to describe my supplemental forwarding devices, which are mounted on the lower edges of the agitators 52. These ear forwarding devices include spring-pressed pivotally mounted members 69 (Figs. 7 to 11), which are mounted in plates 70 secured to the under side of the agitators 52. It will be noted that these ear forwarding members 69 are pivotally mounted in depressed portions or pockets 71 of the members 70 so that the ear forwarding members may be freely movable between the members 70 and agitators 52 or into the pockets 71. One end of a spring 72 engages a struck up portion or projection 73 on each of said ear forwarding members 69, the opposite end of the spring 72 being stationarily fastened to the member 70, the spring normally holding the ear forwarding members out over each pair of husking rolls 24 and into the paths of movement of the ears of corn. As shown in Fig. 10, it will be noted that outward movement of the ear forwarding member 69 is limited by engagement of coöperating stop portions 74 formed on the heel of each of these forwarding members and a shoulder portion 75 of each of the members 70. These ear forwarding members 69 are so arranged that when the agitators are forced rearwardly, said ear forwarding members 69, moving with the agitators, will move under cover into their pockets if they pass into engagement with an ear of corn. However, upon the return movement, or forward movement of the agitator, the pointed portion 76 of each of the ear forwarding members will engage the ears of corn in its path of movement, thus forcing the ears forwardly and downwardly over the chute 77 into the elevator 78. It happens at times that an ear of corn becomes lodged in or around the forward ends of the husking rolls near the elevator, and by providing these ear forwarding members at the forward ends of the agitators 52 in and around parts where the corn has a tendency to become lodged, such ears of corn are forcibly ejected from any lodged position and pushed into the elevator, thus maintaining a clear and free passage for ears of corn from the husking rolls to the elevator. Intermediate the beater shaft 60 and the reciprocatory shaft 65 is a support 79, upon which are pivotally mounted a plurality of depending ear retarders 80 to insure each ear of corn coming in contact with the husking rolls so that the husks may be removed from such ears. The general arrangement of the agitators, ear forwarding device and beater, and their operative connections from the driving source having been considered, driving and power transmitting connections of associated parts will be described.

Consideration will now be given to the means and connections for driving the endless ear conveying chain 81 (Fig. 6), which has the proper wings 82 for engaging the ears of corn as they are snapped from the stalk by the snapping rolls 16 and thrown over into the path of movement of the traveling wings 82. The driving and transmission connection to this ear conveying chain includes a bevel gear 83 mounted on and secured to one end of the secondary power transmitting shaft 28, said gear meshing with another bevel gear 84 mounted on one end of a shaft, on which also is mounted a sprocket wheel 85, over which passes the ear conveying chain 81. Mounted adjacent the sprocket wheel 85, or formed integrally therewith, is a clutch member 86, which has a releasable connection with another clutch member 87, which is yieldingly held against the former clutch member 86 by a spring 88. If, for any reason, the chain should be caught or held stationary, the power transmitted to the gear 84 would not cause a breakage of the chain or the coöperating parts, due to the fact that the clutch members 86 and 87 would rotate relative to each other, thereby preventing transmission of motion to the chain 81. It is seen, therefore, that the driving connection from the secondary power transmitting shaft and, indeed, from the primary power transmitting shaft to the ear conveying chain 81, is simple and includes a minimum number of parts, taking other coöperating parts of the machine into consideration. As stated before, the ears of corn are conveyed from the snapping rolls to the husking rolls by this ear conveying member. The husks which are removed from the ears by the husking rolls are dropped downwardly upon a husk conveyer 89.

This husk conveyer 89 receives its motion through the following connections including a sprocket wheel 90 mounted upon the secondary power transmitting shaft 28, a chain 91 (Figs. 1 and 2) passing over said sprocket wheel and also over another sprocket wheel 92 mounted upon a shaft 93, which is suitably supported in bearing members 94 connected to the frame by links 95. Mounted upon a shaft 93$^1$, operatively connected through suitable gearing with shaft 93, are sprocket wheels which cause movement to be transmitted to the husk conveyer through chains 96 forming a part of such conveyer, the husk conveyer lying below the husking rolls in a manner to catch all of the husks dropped therefrom, and also loosened kernals of corn, the latter of which pass forwardly into the elevator 78 through a suitable chute 97. On one end of the shaft 93$^1$ is a sprocket wheel 98, over which passes a chain 99, which also passes over a sprocket wheel 100 mounted on a shaft 101 (Figs. 1 and 7) suitably supported below the main frame member 15, said shaft having secured thereto gear connections to a bevel gear 102 mounted on one end of a shaft 103 for driving the elevator conveyer belt 104 (Fig. 12), there being a suitable clutch 105 for controlling the connection between the shaft 103 and the elevator conveyer chain 104. It is seen, therefore, that the husk conveyer 89 is driven from a chain passing over a sprocket wheel on the secondary power transmitting shaft, and that the elevator conveyer 104 is driven from the husk conveyer shaft through the chain 99 and shaft 103.

The driving connections for transmitting motion to the snapping rolls will now be considered. It will be noted that the horizontal primary power transmitting shaft 27 extends completely across the rear of the machine and is provided with a universal connection 106 to avoid any cramping should there be a tendency for the parts of the shaft to get out of alinement. At one end of this primary power transmitting shaft 27 there is secured a relatively large bevel gear 107 (Figs. 1, 2 and 3), with which meshes a small bevel gear 108 on one end of a shaft 109, which is directly connected to one of the snapping rolls 16, motion being transmitted to the other of said snapping rolls by intermeshing gears 110 mounted upon the ends of the snapping rolls. It is seen that these forwardly extending snapping rolls 16 are driven directly from the primary power transmitting shaft through the shaft 109, which, as a matter of fact, might be considered a part of one of the snapping rolls. This shaft 109 extends rearwardly, and near its rear end is provided with a sprocket wheel 111, over which passes a chain 112, which also passes over a sprocket wheel 113 mounted upon one end of a short shaft 114, to which is secured a bevel gear 115 meshing with another bevel gear 116 mounted upon one end of a shaft supporting one of the trash rolls 117, the other trash roll 118 being driven from the first trash roll through intermeshing gears 119. These vertical trash rolls are arranged at right angles with respect to primary shaft 27 and snapping rolls 16, and are located at the rear end of the passage leading from the main snapping rolls 16 and ear conveying chain 81. The function of this pair of trash rolls is to remove all trash from the machine and to snap the ears off of broken portions of stalks or protruding ends of long stalks which have passed upwardly in the machine, these rolls preventing the trash and stalks from being passed on into the husking chamber, and passing said trash and stalks outwardly at the rear end of the machine. It is to be noted that the snapping and trash rolls are driven from the primary power transmitting shaft 27 through the large bevel gear 107.

So far as the power transmitting connections are concerned, there remains but one to be considered. This connection is the one by means of which the gathering chains are driven.

Adjacent the relatively large bevel gear 107 on the primary power transmitting shaft 27 is a sprocket 120 (Fig. 1), over which passes a chain 121, which also passes over a sprocket wheel 122 secured to a shaft 123. Mounted on this shaft 123 is a bevel gear 124, with which meshes another bevel pinion 125 mounted upon one end of a shaft 126, at the other end of which is a bevel gear 127 meshing with a bevel gear 128 mounted upon a suitable shaft through which all of the gathering chains 19 on the grainward side of the machine are driven. Also mounted upon the shaft 123 (Fig. 4) is a sprocket wheel 129, over which passes a chain 130 for driving the stubbleward gathering chain through suitable connections 131. It is seen, therefore, that power is transmitted from the primary power transmitting shaft to the gathering chains through connections considered hereinabove in detail.

The operation of the machine in brief is as follows: Stalks bearing ears of corn are engaged by the snapping rolls 16 during the forward travel of the corn picker, the ears being snapped from the stalks and caused to be passed into the path of movement of wings 82 of ear conveyers 81, which cause the ears to be conveyed from the immediate vicinity of the snapping rolls past the trash rolls, where any trash or stalks which have been permitted to pass will be withdrawn, the ears being forced on by the ear conveyer to a point where the ears are deposited into the husking chamber and are treated by the husking rolls, the husks being removed and deposited upon the husk conveyer 89, which discharges rearwardly of the machine. At the same time the ears of corn in the husking chamber are agitated by the agitators 52 and caused to take a parallel position with respect to the husking rolls regardless of the position which they may assume in passing into the husking chamber. The ears are prevented from packing by the beaters 53, and are retarded in their downward movement by the ear retarders 80, which cause all of the ears to be treated by the husking rolls. The ears are forwarded and prevented from becoming lodged and wedged at the lower and forward ends of the husking rolls by the auxiliary ear forwarding members 69, which cause the ears to be forced down over the chute 77 into the elevator 78, by means of which the ears are conveyed upward by the elevator conveyer 104 into a wagon, which may be driven alongside of the corn picker.

The number of power transmitting connections to the various parts have been reduced to the minimum and are arranged to use the smallest amount of power, and the various elements of the corn picker have been designed to so coöperate with each other as to produce the most efficient results. It will be noted that power is received directly from the main wheels 10 and 11 by the primary power transmitting shaft 27. From this primary power transmitting shaft 27 the husking rolls and snapping rolls are driven directly. The trash rolls are driven directly from this primary power transmitting shaft through the shaft 109, and the gathering chains are driven from this main power transmitting shaft through a chain 121. It will be noted also that to the rear of the main power transmitting shaft 27, and parallel therewith, is the secondary power transmitting shaft 28 driven directly from the shaft 27. From this secondary power transmitting shaft the beaters and agitators are actuated through a chain 58. The husk conveyer 89 is operated from this secondary power transmitting shaft 28 through a chain 91, and the elevator is driven from the shaft of the husk conveyer. Also from this secondary power transmitting shaft 28 the corn conveyer 81 for conveying the corn from the snapping rolls to the husking rolls is driven directly through intermeshing gears 83 and 84, the former of which is mounted directly upon the secondary power transmitting shaft. This compact driving arrangement, including all of the various parts, is arranged to produce the most efficient results.

It is evident that various modifications may be made of the arrangement herein particularly shown and described, but it is my intention to cover all such modifications which do not involve a departure from the spirit and scope of my invention.

What I claim as new is:

1. In a corn harvester, the combination of snapping rolls, means for feeding the stalks to the snapping rolls, an independent ear conveyer receiving the ears from said snapping rolls, trash rolls located in substantial alinement with the receiving portion of said ear conveyer, and means for operating said snapping rolls and said trash rolls.

2. In a corn harvester, the combination of a power transmitting shaft, a shaft directly connected to said power transmitting shaft, coöperating snapping rolls one of which is mounted on said latter shaft, an independent endless ear conveyer located at one side of the snapping rolls and receiving the ears therefrom, and trash rolls operatively connected to said second shaft and in substantial alinement with one lap of said conveyer.

3. In a corn harvester, snapping rolls, an ear conveyer adjusted thereto and receiving ears therefrom, a shield plate extending substantially around said conveyer, an opening in said shield plate, and trash rolls disposed in said opening.

4. In a corn harvester, the combination of a primary power transmitting shaft extending across the rear of the harvester, snapping rolls extending forwardly of said power transmitting shaft, means for feeding the stalks to the snapping rolls, an independent ear conveyer receiving the ears from said snapping rolls, trash rolls located rearwardly of said shaft and in substantial alinement with the receiving portion of said ear conveyer, and means for connecting said snapping rolls and trash rolls to said shaft.

5. In a corn harvester, snapping rolls, an endless ear conveyer receiving ears therefrom, a shield plate disposed around the delivery lap of said conveyer, an opening in said shield plate, trash rolls disposed in said opening, and means for operating said snapping rolls and trash rolls.

6. In a corn harvester, snapping rolls, an independent endless ear conveyer receiving ears therefrom, said conveyer being substantially straight on its receiving lap and located at one side of said snapping rolls, and trash rolls disposed in substantial alinement with the receiving lap of said conveyer.

7. In a corn harvester, the combination of a transversely arranged power transmitting shaft, snapping rolls and husking rolls extending forwardly of said power transmitting shaft, means for directly connecting said rolls to said shaft, trash rolls disposed at the rear of said power transmitting shaft, and means for operatively connecting said trash rolls to said snapping rolls.

8. In a corn harvester, the combination of a power transmitting shaft extending across the rear of the harvester, snapping rolls and husking rolls extending forwardly therefrom, means for directly connecting said rolls to said shaft, vertically arranged trash rolls at the rear of said power transmitting shaft, and means for operatively connecting said trash rolls to said shaft.

9. In a corn harvester, the combination of a primary power transmitting shaft, snapping rolls and husking rolls driven directly therefrom, a secondary power transmitting shaft operatively connected to said primary shaft, and an ear conveyer driven from said second shaft for conveying ears of corn from said snapping rolls to said husking rolls.

10. In a corn harvester, the combination of a primary power transmitting shaft, snapping rolls, trash rolls and husking rolls operatively connected to said primary shaft, a secondary power transmitting shaft, and a conveyer actuated thereby for conveying ears of corn from said snapping rolls past said trash rolls and to said husking rolls.

11. In a corn harvester, the combination of a primary power transmitting shaft extending across the rear of the harvester, snapping rolls and husking rolls extending forwardly from said primary power transmitting shaft and being driven therefrom, trash rolls located rearwardly of said primary shaft and operatively connected thereto, a secondary power transmitting shaft operatively connected to said primary shaft, and a conveyer connected to said secondary shaft for conveying ears of corn from said snapping rolls past said trash rolls to said husking rolls.

12. In a corn harvester having a frame, the combination of operatively connected primary and secondary power transmitting shafts, snapping rolls, trash rolls and husking rolls carried by said frame, operative driving connections between said rolls and said primary shaft, an ear conveyer and a husk conveyer carried by said frame, and means for driving said conveyers from said secondary shaft.

13. In a corn harvester having a frame, the combination of operatively connected primary and secondary power transmitting shafts, snapping rolls and trash rolls and husking rolls carried by said frame, means for driving said rolls from said primary shaft, an ear and husk conveyer, and an elevator carried by said frame, and means for operatively connecting said conveyers and said elevator to said secondary shaft.

14. In a corn harvester having a frame, the combination of operatively connected primary and secondary power transmitting shafts, snapping rolls, trash rolls and husking rolls carried by said frame, means for driving said rolls from said primary shaft, an ear conveyer, a husk conveyer, an elevator, ear agitators adjacent said husking rolls, and means for driving said conveyers, elevator and agitators from said secondary shaft.

15. In a corn harvester having a frame, the combination of operatively connected primary and secondary power transmitting shafts, snapping rolls, trash rolls, husking rolls and gathering chains carried by said frame, means for driving said rolls and chains from said primary shaft, an ear conveyer, a husk conveyer, an elevator and ear agitators adjacent said husking rolls and means for driving said conveyers, elevator, and agitators from said secondary shaft.

16. In a corn harvester having husking rolls, the combination of primary and secondary power transmitting shafts, snapping rolls and husking rolls carried by said frame, means for driving said rolls from said primary shaft, an ear conveyer for conveying ears of corn from said snapping rolls to said husking rolls, operative driving connections between said ear conveyer and said secondary shaft, ear agitators adjacent said husking rolls, and means for driving said agitators from said secondary shaft.

In testimony whereof I affix my signature, in the presence of two witnesses.

CLINTON A. HAGADONE.

Witnesses:
RAY D. LEE,
FRANK A. ZABILKA.

Copies of this patent may be obtained for five cents each, by addressing the "Commissioner of Patents, Washington, D. C."